(12) United States Patent
Kamiya et al.

(10) Patent No.: US 9,052,048 B2
(45) Date of Patent: Jun. 9, 2015

(54) FLUID JOINT

(75) Inventors: Takanobu Kamiya, Tokyo (JP); Ryo Nakamura, Tokyo (JP); Katsuya Hako, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 320 days.

(21) Appl. No.: 13/576,020

(22) PCT Filed: Feb. 16, 2011

(86) PCT No.: PCT/JP2011/053250
§ 371 (c)(1),
(2), (4) Date: Jul. 30, 2012

(87) PCT Pub. No.: WO2011/102370
PCT Pub. Date: Aug. 25, 2011

(65) Prior Publication Data
US 2012/0299291 A1    Nov. 29, 2012

(30) Foreign Application Priority Data
Feb. 18, 2010    (JP) .................................. 2010-033896

(51) Int. Cl.
*F16L 37/36* (2006.01)
*F16L 37/252* (2006.01)

(52) U.S. Cl.
CPC .............. *F16L 37/252* (2013.01); *F16L 37/36* (2013.01)

(58) Field of Classification Search
CPC ................................ F16L 37/36; F16L 37/252
USPC ............ 137/572, 614.03, 614.06; 285/82, 87, 285/88
See application file for complete search history.

(56) References Cited

U.S. PATENT DOCUMENTS 3,159,180 A * 12/1964 Courtot et al. ........... 137/614.06
3,201,151 A    8/1965 Westveer (Continued)

FOREIGN PATENT DOCUMENTS

| JP | 2-3163 | 4/1927 |
| JP | 45-3159 | 2/1970 |

(Continued)

OTHER PUBLICATIONS

Notification of Reasons for Rejection issued May 13, 2014 in corresponding Japanese Application No. 2010-033896 (with English translation).

(Continued)

*Primary Examiner* — Craig Schneider
*Assistant Examiner* — Michael R Reid
(74) *Attorney, Agent, or Firm* — Wenderoth, Lind & Ponack, L.L.P.

(57) ABSTRACT

A fluid joint having a first coupler includes a cylindrical first main body and an outer cylinder located at the outer circumferential side of the first main body, which protrudes to a distal end of the first main body, and is provided with a first engagement portion and a second engagement portion at the distal end. The second coupler includes a second main body provided with a third engagement portion that can engage with the first engagement portion and a fourth engagement portion that can engage with the second engagement portion. The phases of the first engagement portion and the third engagement portion match in the process of engagement thereof, so that the second engagement portion and the fourth engagement portion engage with each other to join the outer cylinder and the second main body together.

2 Claims, 7 Drawing Sheets (56) References Cited

U.S. PATENT DOCUMENTS

| | | | |
|---|---|---|---|
| 3,948,545 A | 4/1976 | Bonds | |
| 4,103,712 A | 8/1978 | Fletcher et al. | |
| 4,271,865 A * | 6/1981 | Galloway et al. | 137/614.06 |
| 4,438,779 A * | 3/1984 | Allread | 137/614.06 |
| 4,648,630 A | 3/1987 | Bruch | |
| 5,301,985 A | 4/1994 | Terzini | |
| 5,904,302 A * | 5/1999 | Brown | 137/614.06 |
| 6,863,314 B2 * | 3/2005 | Guest | 285/87 |
| 7,565,917 B2 * | 7/2009 | Kamiya et al. | 137/614.04 |
| 8,322,368 B2 * | 12/2012 | Zenz | 137/614.06 |
| 2004/0201215 A1 | 10/2004 | Steingass | |
| 2010/0018608 A1 * | 1/2010 | Huegerich et al. | 141/388 |

FOREIGN PATENT DOCUMENTS

| | | |
|---|---|---|
| JP | 51-31359 | 3/1976 |
| JP | 56-34195 | 4/1981 |
| JP | 62-26392 | 6/1987 |
| JP | 9-79464 | 3/1997 |
| JP | 9-112777 | 5/1997 |
| JP | 2004-44619 | 2/2004 |
| JP | 2008-286339 | 11/2008 |
| JP | 2008-286340 | 11/2008 |
| NL | 88 353 | 1/1958 |

OTHER PUBLICATIONS

International Search Report issued Mar. 29, 2011 in corresponding International Application No. PCT/JP2011/053250.

Decision to Grant a Patent issued Sep. 24, 2014 in corresponding Japanese patent application No. 2010-033896.

Extended European Search Report issued Oct. 6, 2014 in corresponding European patent application No. 11744656.7.

* cited by examiner

FLUID JOINT

BACKGROUND OF THE INVENTION

1. Technical Field

The present invention relates to a fluid joint preferable for use, in particular, for low-temperature fluid, such as liquefied natural gas (LNG), liquid nitrogen, liquid oxygen, liquid hydrogen, and liquid helium.

2. Description of the Related Art

In general, when supplying low-temperature fluid, such as liquefied natural gas (hereinafter referred to as "LNG"), from a storage tank in an LNG supply depot, an LNG gas station, or the like to a tanker truck or an LNG-powered vehicle, a fluid joint is used which connects a fixed-side coupler (hereinafter referred to as "female-side coupler") connected to a storage tank side and a mobile-side coupler (hereinafter referred to as "male-side coupler") connected to a mobile tank of a tanker truck, an LNG-powered vehicle, or the like (for example, Japanese Unexamined Patent Application, Publication No. 2008-286339; or Japanese Unexamined Patent Application, Publication No. 2008-286340).

SUMMARY OF THE INVENTION

1. Technical Problem

However, the inventions of JP 2008-286339; or JP 2008-286340 has a problem in that the operation of joining the outer cylinder of the male-side coupler and the outer cylinder of the female-side coupler is difficult. Furthermore, when the phases of the joints of the male-side coupler and the female-side coupler differ, there is the problem of imperfect joining of the joints.

The present invention is made in consideration of such circumstances, and it is an object thereof to provide a fluid joint in which the operation of joining a male-side coupler and a female-side coupler is simple.

2. Solution to the Problem

To solve the above problems, a fluid joint of the present invention adopts the following solutions.

That is, a fluid joint according to the present invention comprising a first coupler connected to a storage tank that stores fluid and a second coupler connected to a mobile tank installed in a mobile unit, wherein the couplers are joined together to allow fluid to flow between the storage tank and the mobile tank, wherein the first coupler includes a cylindrical first main body and an outer cylinder which is located at the outer circumferential side of the first main body, which protrudes to a distal end of the first main body, and which is provided with a first engagement portion and a second engagement portion at the distal end; wherein the second coupler includes a second main body inserted along the inner circumferential surface of the first main body; wherein the second main body is provided with a third engagement portion that can engage with the first engagement portion and a fourth engagement portion that can engage with the second engagement portion; and wherein the phases of the first engagement portion and the third engagement portion match in the process of engagement thereof, so that the second engagement portion and the fourth engagement portion engage with each other to join the outer cylinder and the second main body together.

The engagement of the second engagement portion and the fourth engagement portion is performed by matching the phases of the first engagement portion and the third engagement portion in the process of engaging the first engagement portion and third engagement portion. Specifically, they have a positional relationship in which the engagement of the second engagement portion and the fourth engagement portion enables the engagement of the first engagement portion and the third engagement portion. This allows the outer cylinder and the second main body to be joined without individually engaging the first engagement portion with the third engagement portion and the second engagement portion with the fourth engagement portion. Accordingly, this makes the task of joining the first coupler having the outer cylinder and the second coupler having the second main body simple.

The first coupler and the second coupler are engaged with both of the first engagement portion and the third engagement portion and the second engagement portion and the fourth engagement portion. Accordingly, the first coupler and the second coupler can be securely joined.

In a fluid joint according to a first aspect of the present invention, the outer cylinder can freely rotate about the axis with respect to the first main body.

Since the outer cylinder can freely rotate about the axis with respect to the first main body, the outer cylinder can be rotated with respect to the first main body when the second main body is inserted into the first main body. Therefore, even if the phase of the third engagement portion and the fourth engagement portion provided at the second main body and the phase of the first engagement portion and the second engagement portion provided at the outer cylinder of the first main body differ, the phases of the first engagement portion and the third engagement portion, and the phases of the second engagement portion and the fourth engagement portion can easily be aligned. Accordingly, this makes the task of joining the first coupler and the second coupler simple.

In a fluid joint according to a second aspect of the present invention, the first engagement portion is provided at the outer cylinder of the first main body, and the third engagement portion is provided on the outside of the second main body.

The first engagement portion is provided at the outer cylinder of the first main body, and the third engagement portion is provided on the outside of the second main body. This allows the engaging state of the first engagement portion and the third engagement portion to be visually checked. The engagement of the second engagement portion and the fourth engagement portion is performed by matching the phases of the first engagement portion and the third engagement portion in the process of engaging the first engagement portion and the third engagement portion. Therefore, this allows the engaging state of the first engagement portion and the third engagement portion to be visually checked, and the engaging state of the second engagement portion and the fourth engagement portion to be checked. Accordingly, this can prevent incomplete joining of the first coupler and the second coupler.

3. Advantageous Effects of the Invention

According to the present invention, the engagement of the second engagement portion and the fourth engagement portion is performed by matching the phases of the first engagement portion and the third engagement portion in the process of engaging the first engagement portion and third engagement portion. Specifically, they have a positional relationship in which the engagement of the second engagement portion and the fourth engagement portion enables the engagement of the first engagement portion and the third engagement portion. This eliminates the need for individually engaging the first engagement portion with the third engagement portion and the second engagement portion with the fourth engagement portion. Accordingly, this makes the task of joining the first coupler and the second coupler simple.

The first coupler and the second coupler are engaged with both of the first engagement portion and the third engagement portion and the second engagement portion and the fourth engagement portion. Accordingly, the first coupler and the second coupler can be securely joined.

DETAILED DESCRIPTION OF THE INVENTION

An embodiment according to the present invention will be described hereinbelow with reference to the drawings.

Figure 1:
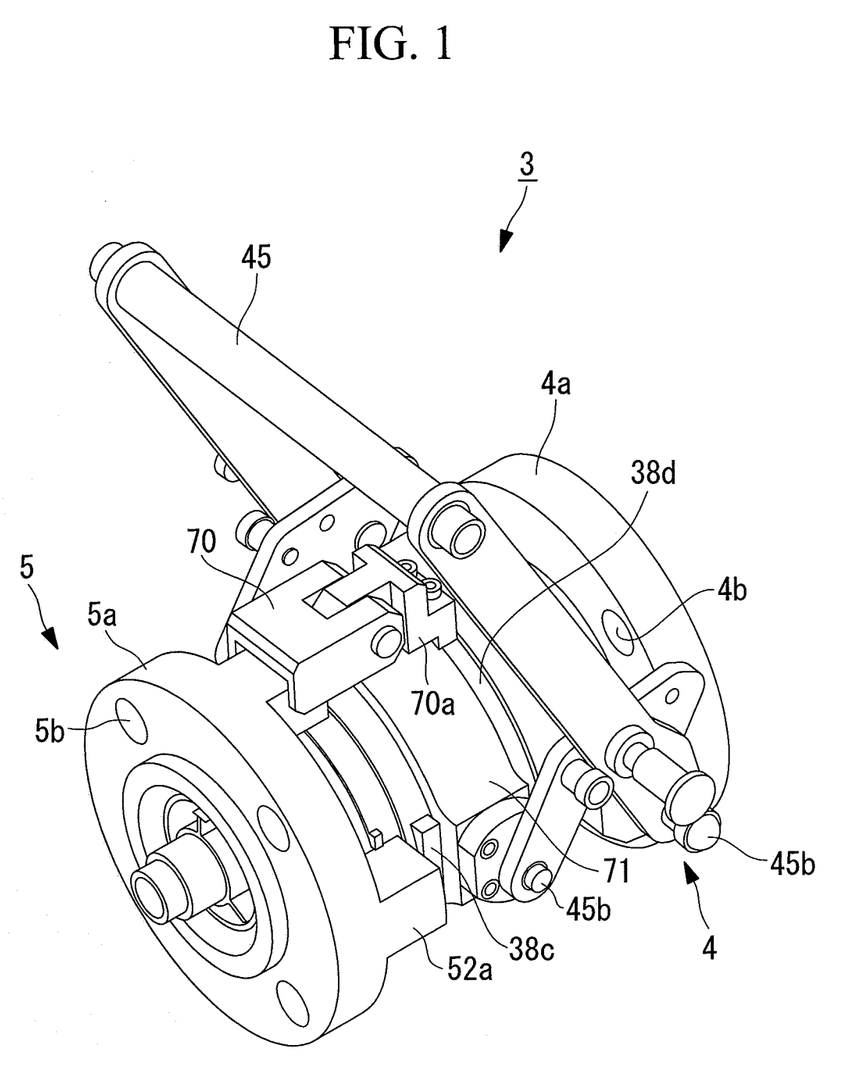
FIG. 1 is a perspective view of a fluid joint according to an embodiment of the present invention.

FIG. 1 shows a perspective view of an LNG joint (fluid joint) 3.

The LNG joint 3 is provided between a storage-tank-side pipe (not shown) provided at a storage tank in an LNG supply depot and a truck-side pipe (not shown) provided in an LNG truck.

The LNG joint (hereinafter referred to as "joint") 3 is equipped with a female-side coupler (first coupler) 4 and a male-side coupler (second coupler) 5.

The female-side coupler 4 is connected to a storage-tank-side pipe in such a manner that a flange 4a provided at the female-side coupler 4 and a flange portion (not shown) provided at a storage-tank-side pipe are fastened together with bolts (not shown). The male-side coupler 5 is connected to an LNG truck in such a manner that a flange 5a provided at a male-side coupler 5 and a flange portion (not shown) provided at a truck-side pipe are fastened together with bolts (not shown).

The female-side coupler 4 and the male-side coupler 5 are joined by engagement of an external locking hook (first engagement portion) 70 provided at the female-side coupler 4 and a protruding portion 52a (third engagement portion) provided at the male-side coupler 5. Supplying and stopping of LNG through the joint 3 are performed by operating an actuating lever 45 to open and close poppet valves (not shown), to be described later.

Figure 2:
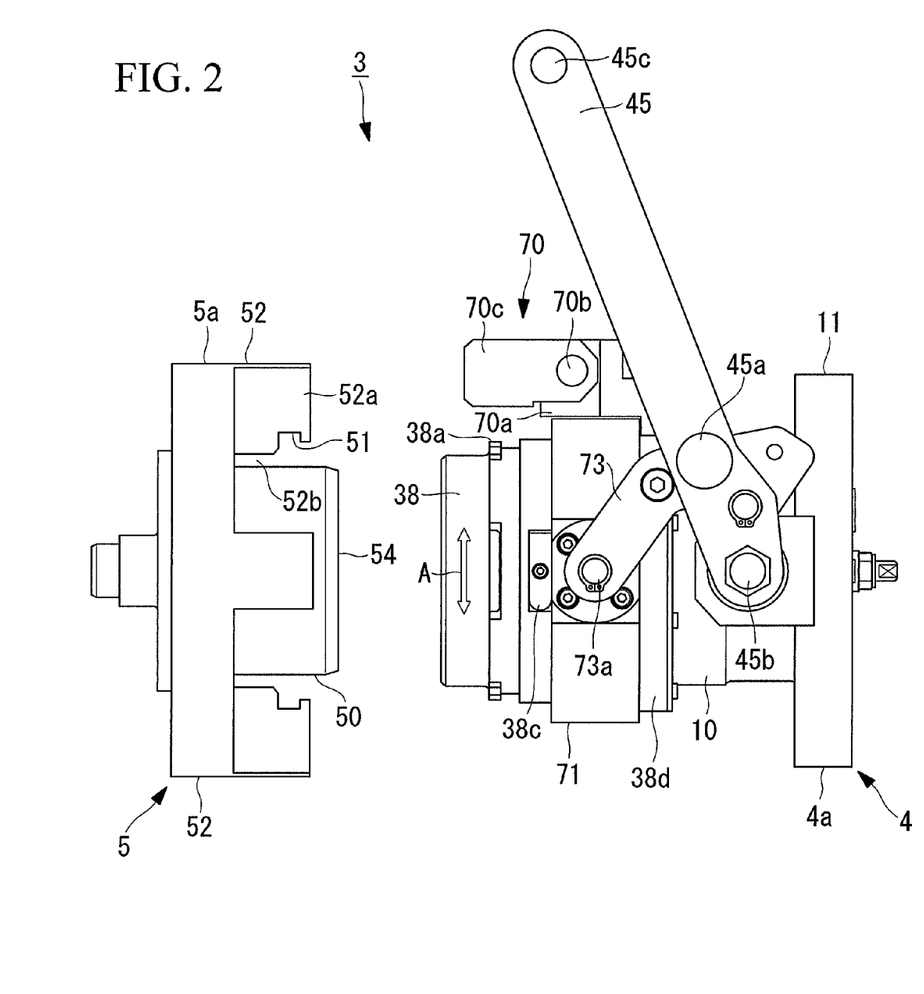
FIG. 2 is a side view of the fluid joint shown in FIG. 1 before being joined.
Figure 3:
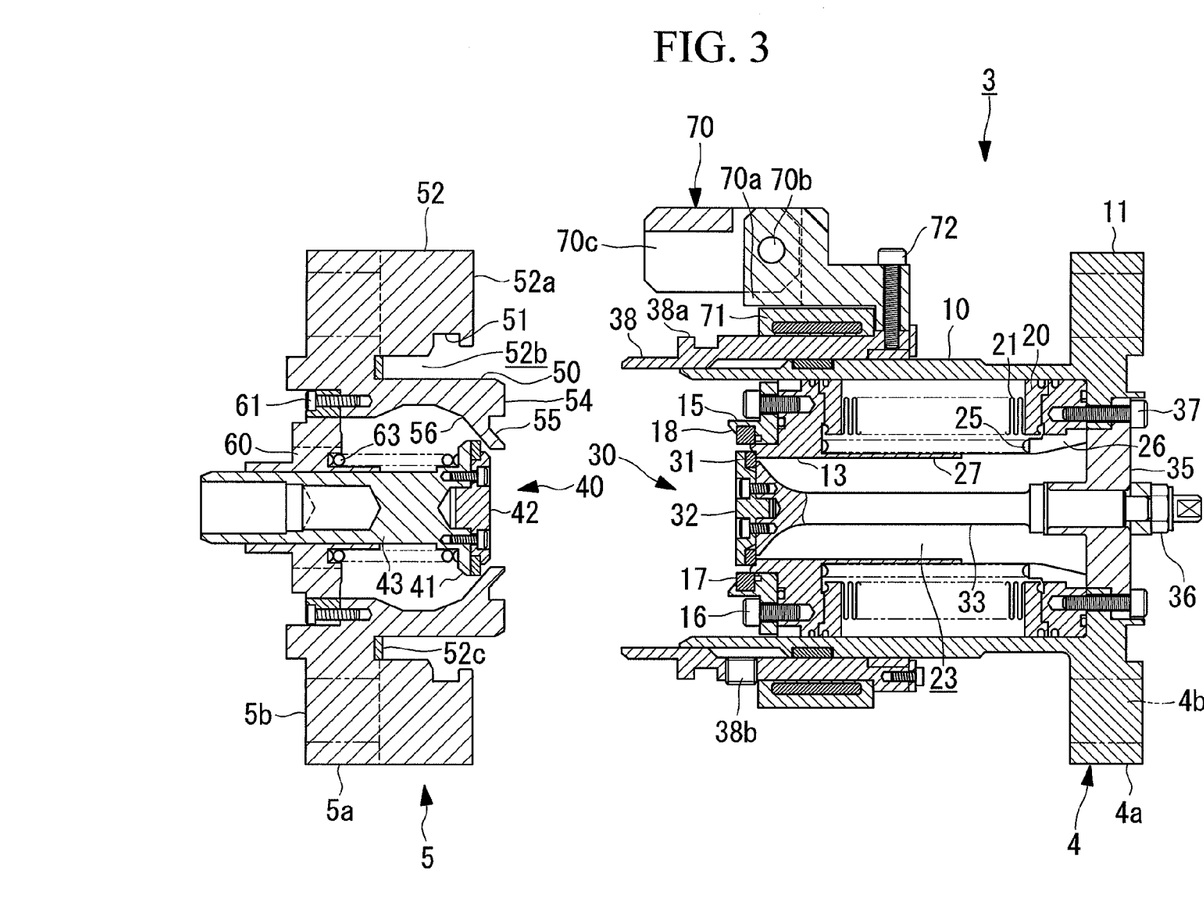
FIG. 3 is a schematic vertical cross-sectional view of the fluid joint before being joined.
Figure 4:
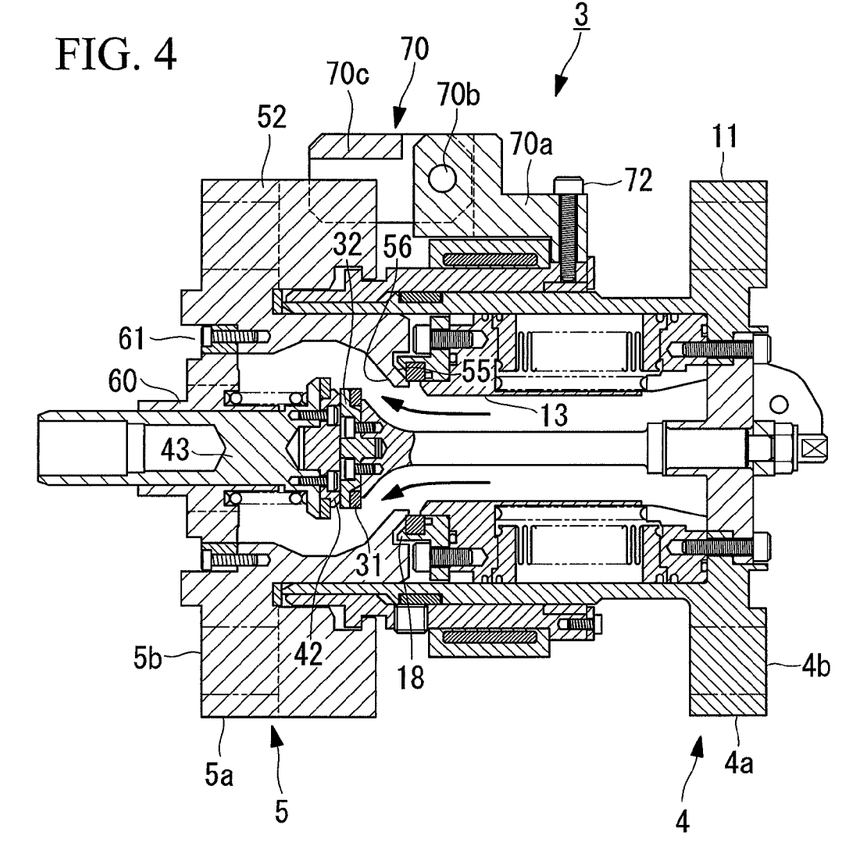
FIG. 4 is a schematic vertical cross-sectional view of the fluid joint in a joined state.
Figure 5A:
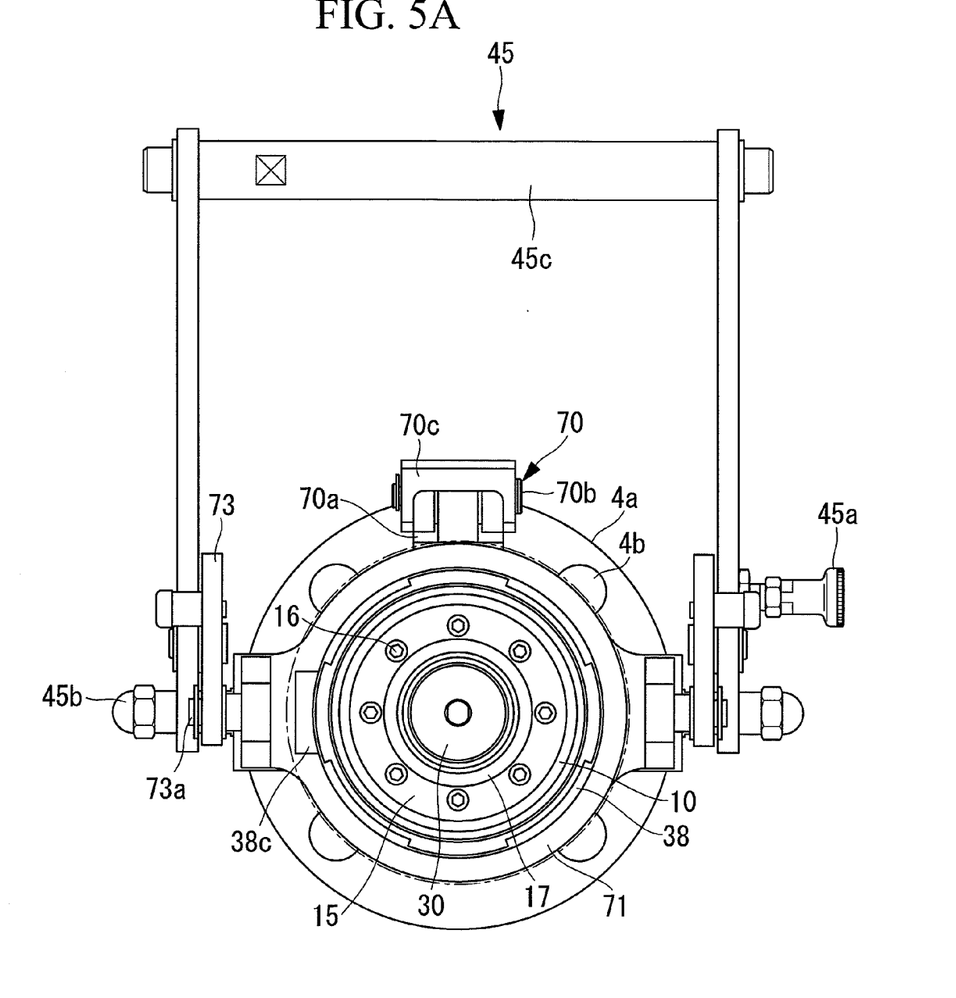
FIG. 5A is a front view of a female-side coupler.
Figure 5B:
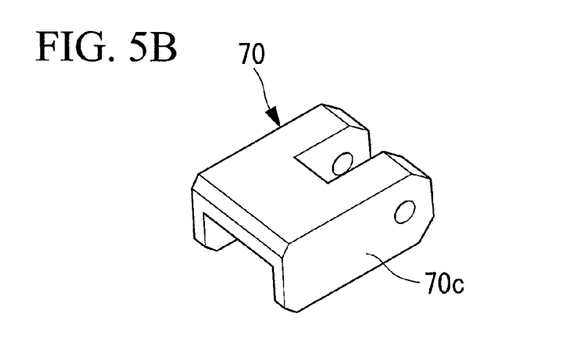
FIG. 5B is a partial enlarged view of an external joining lock of the female-side coupler.
Figure 6A:
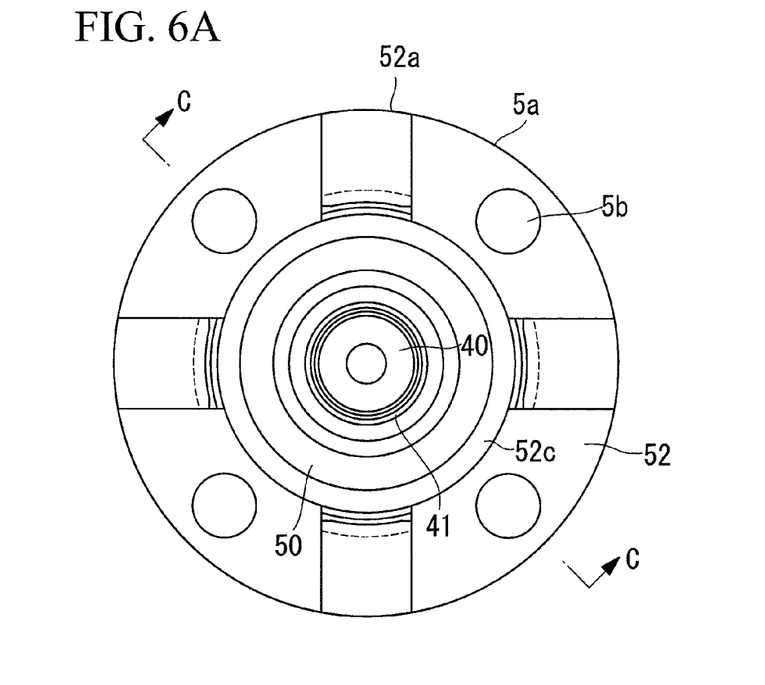
FIG. 6A is a front view of a male-side coupler.
Figure 6B:
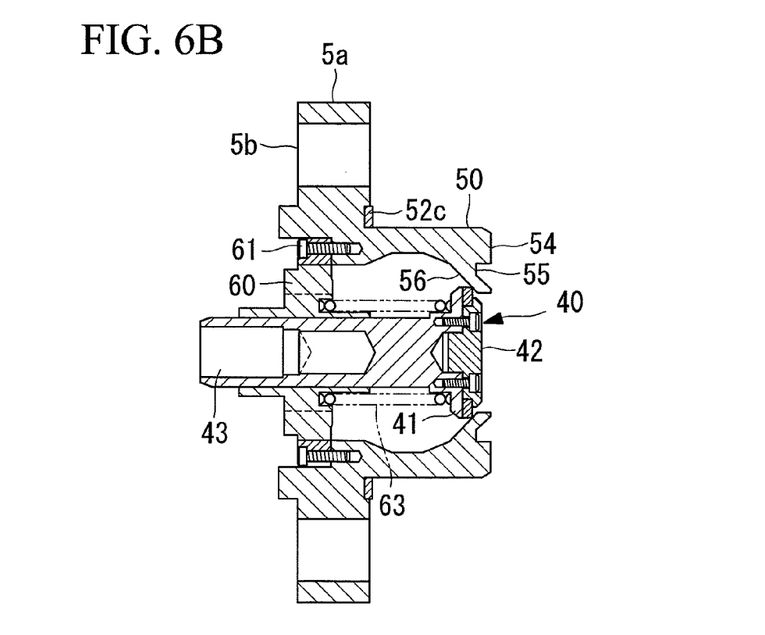
FIG. 6B is a cross-sectional view of the male-side coupler taken along line C-C.
Figure 7:
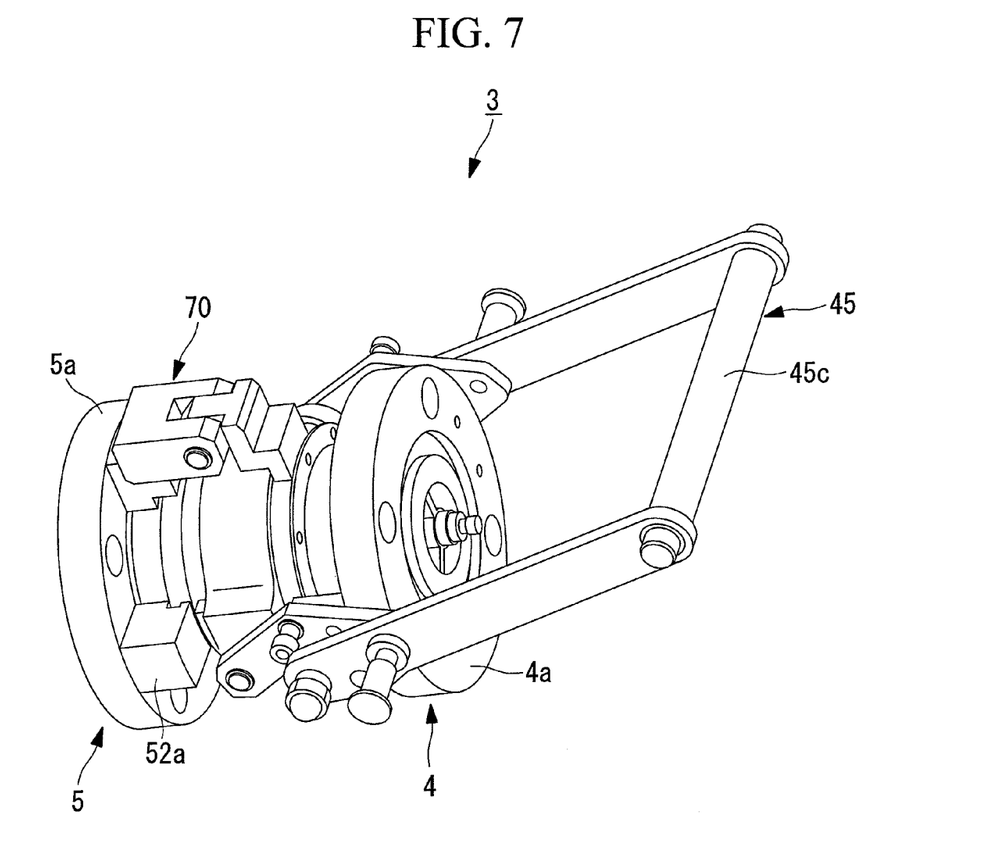
FIG. 7 is a perspective view of the fluid joint in a joined state.

FIG. 2 shows a side view of the female-side coupler 4 and the male-side coupler 5 of the joint 3 in a separated state. FIG. 3 shows a schematic vertical cross-sectional view of the joint 3 before being joined. FIG. 4 shows a schematic vertical cross-sectional view of the joint 3 in a joined state. FIGS. 5A and 5B illustrates the female-side coupler 4 of the joint 3, in which FIG. 5A shows a front view thereof and FIG. 5B shows a partial enlarged view of the external locking hook 70. FIG. 6 illustrates the male-side coupler 5 of the joint 3, in which FIG. 5A shows a front view thereof and FIG. 5B shows a cross-sectional view taken along line C-C in FIG. 5A. FIG. 7 shows a perspective view of the joint 3 in a joined state.

The female-side coupler 4 is equipped with a cylindrical female-side main body 10 (first main body). The female-side main body 10 is cylindrical at a distal end (left in FIGS. 2 and 3) and is equipped with the foregoing flange 4a at a base end portion (right in FIGS. 2 and 3) 11. The flange 4a is provided with a plurality of (for example, four) bolt holes 4b (see FIG. 3) in the circumferential direction.

In this embodiment, the base end indicates the side of flanges 4a and 5a of the couplers 4 and 5, and the distal end indicates the end opposite to the base end in the axial direction. The axial direction indicates a direction in which the couplers 4 and 5 extend (the horizontal direction in FIGS. 2 and 3).

The female-side main body 10 accommodates a sliding ring 13 (see FIG. 3) coaxial with the female-side main body 10. The sliding ring 13 is substantially ring-shaped and can slide in the axial direction with respect to the female-side main body 10. Furthermore, the sliding ring 13 is pivotable with respect to the female-side main body 10.

The distal end of the sliding ring 13 is provided with a sealing block 15 fitted in a recessed portion formed along the outer circumference of the sliding ring 13. The sealing block 15 is fixed to the sliding ring 13 with bolts 16. The bolts 16 are provided at a plurality of positions in the circumferential direction and are screwed from the distal end of the female-side coupler 4. The sealing block 15 is ring-shaped and is provided with a sealing member 17 on a tapered sealing surface 18 formed along the inner circumference. Examples of the material of the sealing member 17 are materials that exhibit a sealing function even at a low temperature of about −162° C., preferably, chlorotrifluoroethylene resin and tetrafluoroethylene resin. Similar materials are used also for sealing members 31 and 41 of poppet valves 30 and 40, to be described later.

Thus, the distal end of the male-side coupler 5, to be described later, can be brought into contact with the sealing surface 18 in a liquidtight manner. The sealing block 15 can be unmounted from the sliding ring 13 by accessing the bolts 16 from the distal end of the female-side coupler 4 and removing them.

One end of an accordion-like bellows 21 coaxial with the sliding ring 13 is fixed to the base end of the sliding ring 13. The other end of the bellows 21 is fixed to a fixed block 20 fixed to the base end portion 11 of the female-side main body 10. The bellows 21 can extend and contract in the axial direction. The bellows 21 forms the outer peripheral limit of the LNG channel 23. That is, the LNG channel 23 is formed at the inner circumferential side of the bellows 21, and the LNG is not allowed to flow along the outer circumferential side of the bellows 21. Accordingly, the LNG flows inside the fixed block 20, the bellows 21, and the sliding ring 13.

A compression spring 25 coaxial with the bellows 21 is placed inside the bellows 21. The compression spring 25 is placed between a spring holder 26 placed at the inner circumferential side of the fixed block 20 adjacent thereto and the end face at the base end of the sliding ring 13, thereby urging the sliding ring 13 toward the distal end to maintain a valve closed state, the state of FIG. 3, in which no load acts on the sliding ring 13.

An inner cylinder 27 coaxial with the sliding ring 13 is provided inside the bellows 21 and the compression spring 25. The inner cylinder 27 is integrally formed so as to be extended from the inner circumferential surface of the sliding ring 13 toward the base end in the axial direction. The LNG flows along the inner circumferential surface of the inner cylinder 27 and the sliding ring 13, which are formed continuously.

A female-side poppet valve 30 extending on the axis of the female-side main body 10 is provided at the inner circumferential side of the sliding ring 13. The female-side poppet valve 30 has a valve shaft 33 extending on the axis and a valve element 32 provided at the distal end of the valve shaft 33.

The valve element 32 is shaped substantially like a truncated cone enlarged in diameter relative to the valve shaft 33 and has a sealing member 31 that is in contact with a valve seat formed on the distal-end innermost circumference of the sliding ring 13. The sealing member 31 is provided with a sealing material, such as chlorotrifluoroethylene resin, described above.

The valve shaft 33 is connected to a valve-shaft fixing member 35 whose base end is fixed to the base end portion 11 of the female-side main body 10. Specifically, the valve-shaft fixing member 35 is fixed to the center of the base end portion 11 of the female-side main body 10, the valve shaft 33 is passed through a hole formed in the center of the valve-shaft fixing member 35, and the valve shaft 33 is fixed with a nut 36. The valve-shaft fixing member 35 is fixed to the female-side main body 10 together with the fixed block 20 and the spring holder 26 with a plurality of bolts 37 provided in the circumferential direction. The female-side poppet valve 30 can be unmounted by removing the nut 36.

An outer cylinder 38 is provided at the outer circumferential side of the female-side main body 10. The outer cylinder 38 is ring-shaped. The outer cylinder 38 is provided with outer-cylinder-side convex portions (second engagement portions) 38a protruding from the outer circumference thereof. The outer-cylinder-side convex portions 38a are provided at a plurality of locations at predetermined intervals in the circumferential direction. The outer-cylinder-side convex portions 38a come into engagement with male-side-main-body concave portions (fourth engagement portions) 51 provided in the protruding portions 52a of the male-side main body 50, described later.

One or a plurality of holes 38b are formed in the cylindrical wall of the outer cylinder 38. These holes 38b are used as holes for purging air that contains moisture. The outer cylinder 38 is provided with a lever supporting cylinder 71 around the outer circumference thereof. The lever supporting cylinder 71 is ring-shaped. Key portions 38c (see FIG. 5A) protruding outwards in the radial direction are provided at two locations of the outer circumferential side of the outer cylinder 38. This restricts movement of the lever supporting cylinder 71 toward the distal end in the axial direction (to the left in FIGS. 2 and 3)

An external locking base portion 70a of the external locking hook 70 is fixed to the outer cylinder 38 with external locking bolts 72. This allows the outer cylinder 38 and the external locking hook 70 to pivot together with respect to the female-side main body 10.

The lever supporting cylinder 71 is provided so as to be held between the flange portion 38d provided at the base end of the outer cylinder 38 and the key portions 38c provided at the outer cylinder 38 (see FIG. 1). This restricts movement of the lever supporting cylinder 71 toward the base end in the axial direction. The lever supporting cylinder 71 is placed between the outer cylinder 38 and the key portions 38c but is not fixed to outer cylinder 38. Therefore, this allows the lever supporting cylinder 71 to pivot freely about the outer cylinder 38.

The external locking hook 70 includes an external locking base portion 70a, an external locking pin member 70b connected to the external locking base portion 70a, and a hook portion 70c connected to the external locking base portion 70a so as to be rotatable thereabout with the external locking pin member 70b. The external shape of the hook portion 70c is a rectangular parallelepiped (see FIG. 5B). The hook portion 70c has a downward recessed portion and has a U-shaped cross-section perpendicular to the axial direction. The size of the recessed portion of the hook portion 70c is set so that it fits on the protruding portion 52a provided at a base end portion 52 of the male-side coupler 5. The hook portion 70c is provided at the same phase position as one of the outer-cylinder-side convex portions 38a in the circumferential direction.

The outer cylinder 38 can move in the axial direction relative to the female-side main body 10. Specifically, the outer cylinder 38 is moved in the axial direction by pivoting the actuating lever 45. The actuating lever 45 is provided with pivoting support points 45a at actuating-lever connecting members 73. The actuating-lever connecting members 73 are connected to the outer circumference of the lever supporting cylinder 71 with bolts 73a for the actuating-lever connecting member.

The actuating lever 45 is fixed to the female-side main body 10 at points of action 45b so as to be freely rotatable. This allows the female-side main body 10 and the outer cylinder 38 to be moved relative to each other in the axial direction by pivoting the actuating lever 45. That is, by pulling a gripper 45c of the actuating lever 45 from a position above the outer cylinder 38 toward the female-side main body 10 to tilt the actuating lever 45, the female-side main body 10 can be moved toward the distal end with respect to the outer cylinder 38 (see FIG. 7).

The male-side coupler 5 has the cylindrical male-side main body 50. The male-side main body 50 is cylindrical at the distal end (right in FIGS. 2 and 3) and has the foregoing flange 5a at the base end portion (left in FIGS. 2 and 3) 52. The protruding portions (third engagement portions) 52a protruding to the distal end are formed along the outer circumference of the base end portion 52.

The flange 5a of the base end portion 52 is provided with bolt holes 5b (see FIG. 6). These bolt holes 5b are provided at a plurality of (for example, four) locations in the circumferential direction. The base end portion 52 is further provided with the plurality of protruding portions 52a between the bolt holes 5b at predetermined intervals in the circumferential direction.

The inner circumferences of the base end portions 52 are provided with inserted concave portions 52b formed by the protruding portions 52a. The distal end of the outer cylinder 38, described above, is inserted into the inserted concave portions 52b. This simplifies aligning of the axial centers of the couplers 4 and 5. The inserted concave portions 52b are provided with sealing members 52c that seal a space between them and the distal end of the inserted outer cylinder 38.

The inner circumferential surfaces of the protruding portions 52a are provided with male-side-main-body concave portions 51. The male-side-main-body concave portions 51 are provided at a plurality of locations at predetermined intervals in the circumferential direction. The male-side-main-body concave portions 51 are depressed outwards in the radial direction so as to engage with the outer-cylinder-side convex portions 38a provided at the female-side coupler 4. The male-side-main-body concave portions 51 and the protruding portions 52a are provided at the same phase positions in the circumferential direction. Since the outer-cylinder-side convex portions 38a and the hook portion 70c provided at the female-side coupler 4 are provided at the same phase positions in the circumferential direction, the phase positions of the male-side-main-body concave portions 51 and the outer-cylinder-side convex portions 38a provided at the female-side coupler 4 in the circumferential direction can be made the same by aligning the protruding portions 52a and the hook portion 70c provided at the female-side coupler 4 in the circumferential direction.

The male-side main body 50 is provided with a distal-end cylindrical portion 54 at the distal end thereof. The inner circumferential side at the distal end face of the distal-end cylindrical portion 54 serves as a sealing surface 55 that comes into contact with the sealing surface 18 provided at the distal end of the foregoing sliding ring 13. A base-end wall 56 of the distal-end cylindrical portion 54 is a conical tapered surface, which serves as a valve seat with which the sealing member 41 of the male-side poppet valve 40 comes into contact.

The male-side main body 50 accommodates the male-side poppet valve 40.

The male-side poppet valve 40 has a valve shaft 43 extending along the axis thereof and a valve element 42 provided at the distal end of the valve shaft 43.

The valve element 42 has a shape that is enlarged in diameter relative to the valve shaft 43 and has a sealing member 41 that is in contact with the valve seat formed at the base-end wall 56 of the distal-end cylindrical portion 54. The sealing member 41 is provided with a sealing material, such as chlorotrifluoroethylene resin, described above.

When the poppet valves 30 and 40 are joined together, the flat surface of the valve element 42 of the male-side poppet valve 40 and the flat surface of the valve element 32 of the female-side poppet valve 30 correspond to each other (see FIG. 4). Accordingly, when the distal end faces of the poppet valves 30 and 40 are opposed to each other when the couplers 4 and 5 are connected together, almost no gap is formed around the distal ends of the poppet valves 30 and 40.

The flat surface of the valve element 42 is placed at a position slightly retracting from the distal end of the distal-end cylindrical portion 54, described above, toward the base end.

The male-side main body 50 is provided with a spring holder 60 at the inner circumference at the base end thereof. The spring holder 60 is fixed to the male-side main body 50 with bolts 61 placed at a plurality of locations on the outer circumference. The spring holder 60 has a hole at the center of the spring holder 60, through which the base end of the valve shaft 43 of the male-side poppet valve 40 passes. The valve shaft 43 can freely move in the axial direction with respect to the spring holder 60. Accordingly, the male-side poppet valve 40 can be unmounted together with the spring holder 60 by removing the bolts 61.

A compression spring 63 that is coaxial with the valve element 40 is placed between the spring holder 60 and the base end face of the valve element 40. The male-side poppet valve 40 is urged toward the distal end by the compression spring 63 to maintain the valve closed state in the state shown in FIG. 3 in which a load acting toward the base end does not act on the distal end face of the male-side poppet valve 40.

Next, a procedure for joining the female-side coupler 4 and the male-side coupler 5 of the joint 3 with the above configuration will be described.

First, the male-side coupler 5 connected to the truck-side pipe of an LNG truck is brought close to the female-side coupler 4 connected to the storage-tank-side pipe. The distal-end cylindrical portion 54 of the male-side main body 50 of the male-side coupler 5 is inserted into the inner circumferential side of the outer cylinder 38 of the female-side coupler 4 so as to be accommodated therein. At that time, the distal end portion of the outer cylinder 38 is guided by the inserted concave portion 52b formed in the male-side main body 50.

By turning the outer cylinder 38 in the direction of arrow A shown in FIG. 2, the outer cylinder 38 and the external locking hook 70 are pivoted around the axis. By pivoting the outer cylinder 38 around the axis, the external locking hook 70 and the protruding portions 52a provided at the male-side main body 50 are aligned to the same phase. Aligning the external locking hook 70 and the protruding portions 52a to the same phase positions allows the outer-cylinder-side convex portions 38a of the outer cylinder 38 and the male-side-main-body concave portions 51 to be engaged. The distal end of the hook portion 70c of the external locking hook 70 is pivoted toward the distal end with respect to the external locking base portion 70a. Thus, the hook portion 70c comes into engagement with the protruding portion 52a provided at the male-side main body 50. The engagement of the hook portion 70c and the protruding portion 52a ensures the engagement of the outer-cylinder-side convex portions 38a and the male-side-main-body concave portions 51. By the engagement of the external locking hook 70 and the protruding portion 52a and the engagement of the outer-cylinder-side convex portions 38a and the male-side-main-body concave portions 51, the outer cylinder 38 and the male-side main body 50 are joined together. Since the outer cylinder 38 and the male-side main body 50 are joined, the procedure for coupling the female-side coupler 4 and the male-side coupler 5 ends.

In this state, both the poppet valves 30 and 40 of the couplers 4 and 5 are closed. In a state before the valves are closed in which the distal-end cylindrical portion 54 of the male-side coupler 5 is inserted in the female-side main body 10, the flat surface of the valve element 32 of the poppet valve 30 and the flat surface of the valve element 42 of the poppet valve 40 are separated from each other by a slight gap.

Next, a procedure for opening the poppet valves 30 and 40 will be described.

By pulling the gripper 45c of the actuating lever 45 from a position above the outer cylinder 38 toward the female-side main body 10 to tilt the actuating lever 45, as shown in FIG. 7, the female-side main body 10 is moved toward the distal end along the axial direction with respect to the outer cylinder 38. With this action, the flat surface of the valve element 32 of the poppet valve 30 and the flat surface of the valve element 42 of the poppet valve 40 come into contact with each other. Since the distal end face shapes of the poppet valves 30 and 40 substantially fit with each other, almost no gap is formed. Furthermore, the sealing surface 18 of the sliding ring 13 and the sealing surface 55 of the distal-end cylindrical portion 54 are pushed to reliably come into contact with each other. The sliding ring 13 moves toward the base end with respect to the female-side poppet valve 30, so that the sealing member 31 of the female-side poppet valve 30 is separated from the sliding ring 13, and thus the female-side poppet valve 30 is opened. As the sliding ring 13 moves, the bellows 21 contracts due to compression.

On the other hand, the female-side poppet valve 30 moves into the male-side main body 50 and comes into contact with the distal end face of the male-side poppet valve 40 to push it in the axial direction to move the male-side poppet valve 40 toward the base end along the axial direction. Thus, the sealing member 41 of the male-side poppet valve 40 is separated from the base-end wall 56 to open the valve. As the male-side poppet valve 40 moves, the base end of the valve shaft 43 of the male-side poppet valve 40 enters the truck-side pipe.

The female-side poppet valve 30 and the male-side poppet valve 40 are opened in this way, and the LNG flows in the direction indicated by the arrows in FIG. 4. Although the LNG flowing direction shown in the drawing is from the storage tank side to the truck side, of course, it can flow in the reverse direction (that is, from the truck side to the storage tank side).

To stop the supply of the LNG, a procedure opposite to the above is performed.

That is, by turning the gripper 45c of the actuating lever 45 pulled to the female-side main body 10 side so as to be located above the outer cylinder 38, the female-side main body 10 is moved to the right in FIG. 4 along the axial direction so as to be separated from the outer cylinder 38. Thus, the poppet valves 30 and 40 are closed. By pivoting the distal end of the hook portion 70c of the external locking hook 70 toward the base end of the female-side main body 10, the engagement of the external locking hook 70 and the protruding portion 52a is released.

After the engagement of the external locking hook 70 and the protruding portion 52a is released, the outer cylinder 38 is pivoted about the axis. Thus, the engagement of the outer-cylinder-side convex portions 38a and the male-side-main-body concave portions 51 is released. After the engagement of the outer-cylinder-side convex portions 38a and the male-side-main-body concave portions 51 is released, the male-side coupler 5 is separated from the female-side coupler 4.

The joint 3 according to this embodiment provides the following operational advantages, as described above.

The engagement of the outer-cylinder-side convex portion (second engagement portion) 38a and the male-side-main-body concave portion (fourth engagement portion) 51 is performed by engaging the external locking hook (first engagement portion) 70 and the protruding portion (third engagement portion) 52a. Specifically, they have a positional relationship in which the engagement of the outer-cylinder-side convex portions 38a and the male-side-main-body concave portions 51 enables engagement of the external locking hook 70 and the protruding portions 52a. This allows the outer cylinder 38 and the male-side main body 50 to be joined without individually engaging the external locking hook 70 with the protruding portion 52a and the outer-cylinder-side convex portions 38a with the male-side-main-body concave portions 51. Since the outer cylinder 38 and the male-side main body (second main body) 50 can be joined in this way, the task of joining the female-side coupler (first coupler) 4 having the outer cylinder 38 and the male-side coupler (second coupler) 5 having the male-side main body 50 is simplified.

The female-side coupler 4 and the male-side coupler 5 are engaged with both of the external locking hook 70 and the protruding portion 52a and the outer-cylinder-side convex portions 38a and the male-side-main-body concave portions 51. Accordingly, the female-side coupler 4 and the male-side coupler 5 can be securely joined.

Since the outer cylinder 38 can freely rotate about the axis with respect to the female-side main body (first main body) 10, the outer cylinder 38 can be pivoted with respect to the female-side main body 10 when the male-side main body (second main body) 50 is inserted into the female-side main body 10. Therefore, even if the phase of the protruding portions 52a and the male-side-main-body concave portions 51 provided at the male-side main body 50 and the phase of the external locking hook 70 and the outer-cylinder-side convex portions 38a provided at the outer cylinder 38 of the female-side main body 10 differ, the phases of the external locking hook 70 and the protruding portion 52a, and the phases of the outer-cylinder-side convex portions 38a and the male-side-main-body concave portions 51 can easily be aligned. Accordingly, this makes the task of joining the female-side coupler 4 and the male-side coupler 5 simple.

The external locking hook 70 is provided at the outer cylinder 38 of the female-side main body 10, and the protruding portions 52a are provided on the outside of the male-side main body 50. This allows the engaging state of the external locking hook 70 and the protruding portion 52a to be visually checked. The engagement of the outer-cylinder-side convex portions 38a and the male-side-main-body concave portions 51 is performed by matching the phases of the external locking hook 70 and the protruding portion 52a. Therefore, this allows the engaging state of the external locking hook 70 and the protruding portion 52a to be visually checked, and the engaging state of the outer-cylinder-side convex portions 38a and the male-side-main-body concave portions 51 to be checked. Accordingly, this can prevent incomplete joining of the female-side coupler 4 and the male-side coupler 5.

Although the foregoing embodiment has been described using LNG as an example of the low-temperature fluid, the present invention is not limited thereto; it can also be applied to, for example, liquid nitrogen, liquid hydrogen, liquid oxygen, and liquid helium.

REFERENCE SIGNS LIST

3 LNG joint (fluid joint)
4 female-side coupler (first coupler)
5 male-side coupler (second coupler)
10 female-side main body (first main body)
38 outer cylinder
38a outer-cylinder-side convex portion (second engagement portion)
50 male-side main body (second main body)
51 male-side-main-body concave portion (fourth engagement portion)
52a protruding portion (third engagement portion)
70 external locking hook (first engagement portion)

The invention claimed is:
1. A fluid joint comprising:
a first coupler connected to a storage tank that stores fluid; and
a second coupler connected to a mobile tank installed in a mobile unit,
wherein the couplers are joined together to allow fluid to flow between the storage tank and the mobile tank,
wherein the first coupler includes a cylindrical first main body and an outer cylinder which is located at the outer circumferential side of the first main body, which protrudes to a distal end of the first main body, and which is provided with a first engagement portion and a second engagement portion at the distal end,
wherein the second coupler includes a second main body inserted along the inner circumferential surface of the first main body,
wherein the second main body is provided with a third engagement portion that can engage with the first engagement portion and a fourth engagement portion that is provided on inner circumferential surfaces of the third engagement portion and that can engage with the second engagement portion,
wherein the first engagement portion includes:
a base portion;
a pin member that is connected to the base portion; and
a hook portion that is connected to the base portion via the pin member so as to be rotatable relative to the base portion, wherein the fourth engagement portion is provided at the same phase position as the third engagement portion in the circumferential direction, wherein the second engagement portion is provided at the same phase position as the hook portion of the first engagement portion in the circumferential direction, and wherein the phases of the first engagement portion and the third engagement portion match in the process of engagement thereof, so that the second engagement portion and the fourth engagement portion engage with each other so as to be in the same phase position in the circumferential direction by matching the phase about an axis of the hook portion of the first engagement portion with the phase about the axis of the third engagement portion, and pivoting a distal end of the hook portion with respect to the base portion to engage the hook with the third engagement portion to join the outer cylinder and the second main body together.

2. The fluid joint according to claim 1, wherein the outer cylinder can freely rotate about the axis with respect to the first main body.

\* \* \* \* \*